United States Patent [19]
Mercier

[11] Patent Number: 5,328,574
[45] Date of Patent: Jul. 12, 1994

[54] WATER TREATMENT PROCESS FOR ELECTROLYSIS, IN PARTICULAR FOR WATER DECARBONIZATION, AND APPARATUS FOR CARRYING OUT THIS PROCESS

[76] Inventor: Dominique Mercier, Résidence le Lac - Esc. 1.-4, rue Georges Millandy, 92360 Meudon-la-Foret, France

[21] Appl. No.: 30,135
[22] PCT Filed: Sep. 13, 1991
[86] PCT No.: PCT/FR91/00725
§ 371 Date: Mar. 12, 1993
§ 102(e) Date: Mar. 12, 1993
[87] PCT Pub. No.: WO92/05116
PCT Pub. Date: Apr. 2, 1992

[30] Foreign Application Priority Data
Sep. 14, 1990 [FR] France .................. 90 11413

[51] Int. Cl.⁵ .................................. C02F 1/461
[52] U.S. Cl. ...................... 204/149; 204/228; 204/229; 204/231; 204/272; 204/273; 204/275
[58] Field of Search ............ 204/149, 272, 273, 275, 204/231, 228, 229

[56] References Cited
U.S. PATENT DOCUMENTS

| | | |
|---|---|---|
| 3,706,646 | 12/1972 | Gibson, Jr. et al. .................. 204/149 |
| 3,871,989 | 3/1975 | King .................................... 204/299 |
| 3,964,991 | 6/1976 | Sullins ................................. 204/275 |
| 4,734,176 | 3/1988 | Zemba, Jr. et al. ................. 204/149 |

Primary Examiner—John Niebling
Assistant Examiner—Arun S. Phasge
Attorney, Agent, or Firm—McAulay Fisher Nissen Goldberg & Kiel

[57] ABSTRACT

The present invention concerns a process for water treatment by electrolysis, particularly for decarbonizing water, as well as an apparatus for carrying out this process.

This process is characterized in that a metal is chosen for the cathode (1) whose redox potential, which constitutes a reference potential remaining substantially constant relative to the water during the electrolysis, is greater than the effective reduction threshold of the water so as to prevent the reduction of this water and during electrolysis the OH⁻ ions required for the nucleation of the calcium carbonate are produced exclusively from the dissolved oxygen in the water.

24 Claims, 2 Drawing Sheets

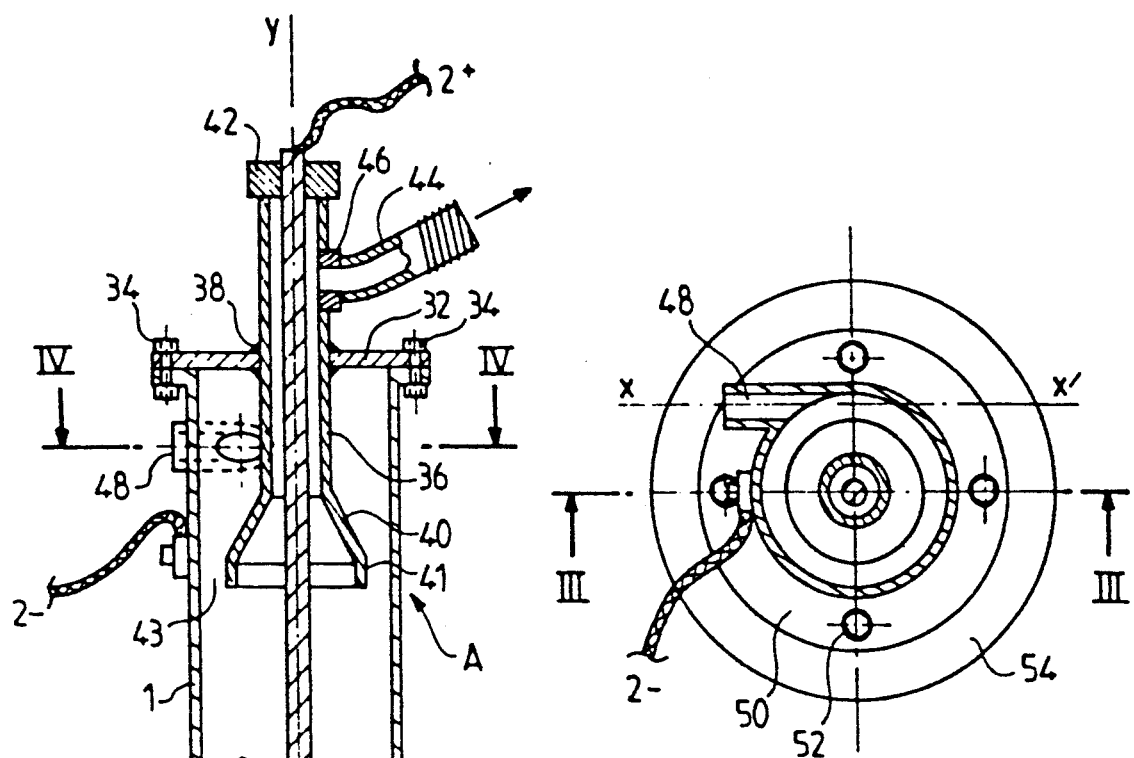
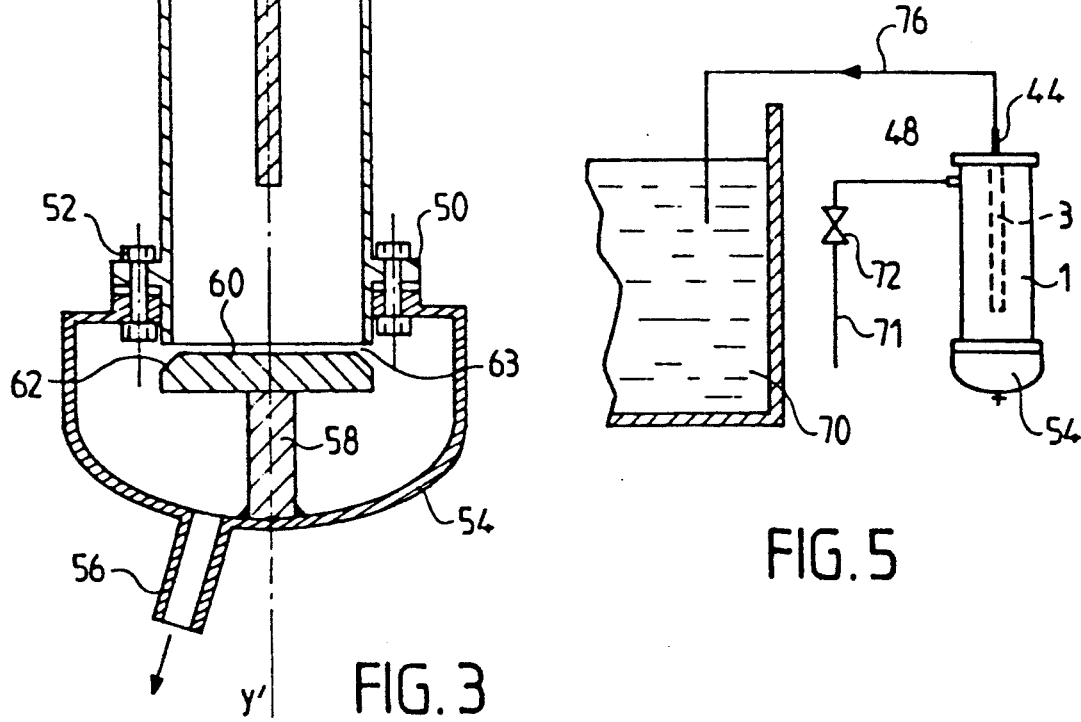
FIG. 4
FIG. 3
FIG. 5

WATER TREATMENT PROCESS FOR ELECTROLYSIS, IN PARTICULAR FOR WATER DECARBONIZATION, AND APPARATUS FOR CARRYING OUT THIS PROCESS

The present invention concerns a process for water treatment by electrolysis, particularly for decarbonizing water, as well as an apparatus for carrying out this process.

Among the various water treatments aiming at decarbonization, different processes and electric apparatuses based on electrolysis of water are already known. In such known electrolysis apparatuses an electric current passes by ionic conduction within the water between two electrodes, i.e. an anode connected to the positive pole of a mains supply and a cathode connected to the negative pole of this mains. The electrolysis of the water causes, at the cathode, the nucleation of calcium carbonate formed from the calcium bicarbonate present in the water, then its crystallization and consequently its neutralization.

In presently known apparatuses for electrolysis of water which are utilized for decarbonization of water, the potentials of the electrodes resulting from the flow of electrical current through the water by ionic conduction are not correctly utilized and are not adjusted and controlled in relation to the solvent represented by the water.

In particular, these apparatuses do not take into account the characteristics of the electrodes or the redox potentials of the water which determine its stability. This leads to phenomena which inhibit the nucleation of the calcium carbonate, corrosion phenomena and/or furring or deposits at the location of the electrodes of the apparatus as well as downstream of these apparatuses. Moreover, since the operation of these apparatuses is not regulated relative to the water, it is impossible to obtain the yields estimated by theory.

The present invention aims at overcoming these disadvantages by providing a process and an apparatus enabling the neutralization of hardness in water in a particularly economical, reliable and permanent manner.

To this end, this process for water treatment by electrolysis, particularly for decarbonizing water, in which an electric current is passed through the water by ionic conduction between an anode and a cathode connected, respectively, to the positive and negative poles of an electric control device is characterized in that a metal is chosen for the cathode whose redox potential, which constitutes a reference potential remaining substantially constant relative to the water during the electrolysis, is greater than the effective reduction threshold of the water so as to prevent the reduction of this water and during electrolysis the $OH^-$ ions required for the nucleation of the calcium carbonate are produced exclusively from the dissolved oxygen in the water.

Another object of the invention is an apparatus for the treatment of water by electrolysis for the purpose of decarbonizing the latter having an electrolytic cell and an electric control device. The electrolytic cell has a tank to which are connected a feed pipe for the treated water and an outlet pipe for the treated water, at least one anode being engaged in the tank, characterized in that the tank constitutes the cathode of the electrolytic cell and is constructed of a metal whose redox potential is greater than the effective reduction threshold of the water.

Various embodiment forms of the present invention are described in the following by way of non-limiting examples with reference to the attached drawing:

FIG. 1 is a schematic view in vertical section of an electrolytic tank which can be used for implementing the water decarbonization process according to the invention;

FIG. 2 it a wiring diagram of the electric control device of the electrolytic tank according to the invention;

FIG. 3 is a view in longitudinal and vertical section of a constructional variant of the invention;

FIG. 4 is a sectional view along line IV—IV in FIG. 3 of the constructional variant shown in the latter;

FIG. 5 is a schematic view of another constructional variant of the invention.

Figure 1:
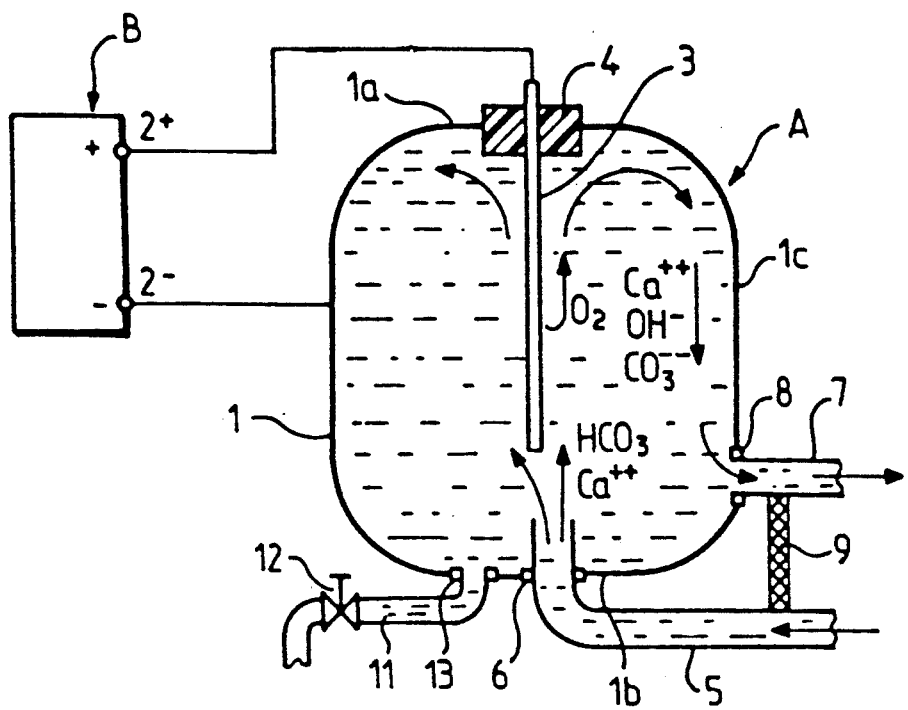

The electrolysis apparatus shown in FIG. 1 substantially includes an electrolytic cell A and an electric control device B. The electrolytic cell A has a metallic tank 1 forming the cathode of cell A and is connected to the negative pole 2— of the electric control device B. The tank 1 contains at least one anode 3 which is connected to the positive pole 2+ of the electric control device B. This anode 3 preferably extends vertically at the center of the tank 1 and passes through the upper wall 1a of the tank 1 so as to be separated from the latter by an electrically insulating sleeve 4. Water flows through the tank 1 during the electrolysis, the water being carried into the tank 1 by a feed pipe 5 opening into the bottom 1b of the tank 1. The tank 1 is electrically insulated relative to the latter by an insulating sleeve 6. An outlet pipe 7 for treated water is connected to the lateral surface of the tank 1, this pipe 7 being electrically insulated relative to the lateral wall 1c of the tank 1 by an insulating sleeve 8. The electrical conductivity of the pipes 5 and 7 is realized by an external conductor 9 such as a copper cable, which connects the feed 5 and outlet 7 pipes without contacting the tank 1. Finally, a discharge duct 11 connected to a drain cock 12 opens out in the bottom 1b of the tank 1 and is likewise electrically insulated from this bottom by an insulating sleeve 13.

According to the invention, the tank 1 is supported by any suitable insulating means insulating it from the ground. It is constructed from metal, e.g. iron, whose redox potential constituting a reference potential is judiciously selected so as to prevent certain reactions when contacted. This redox potential of the cathode 1 which constitutes the reference potential of the apparatus is not influenced by the flow of current during the electrolysis and substantially retains its initial value relative to the water. The tank 1 constituting the cathode is insulated from the ground in order to ensure its stability. However, for certain specific applications or when special safety conditions are required, such insulation may not be realized.

Experience and electrochemical theory in aqueous solution make it possible to determine how advisably to select the redox potential, i.e. the metal constituting the cathode 1, in order to prevent uncontrolled reduction of the water at the cathode. Such an uncontrolled reduction would cause an evolution of hydrogen on the one hand and on the other hand the rapid formation of calcium carbonate on the cathode 1, which would impair the efficiency of the apparatus. The hydrogen evolution at the cathode which is caused by the effective reduction of the water allows the production of $OH^-$ ions, but this production predominates at the surface of the cathode, which explains the formation of calcium carbonate deposits on this surface.

In order to impose a maximum limit on gas evolution, particularly hydrogen evolution at the cathode, which is liable to cause corrosion, and to limit the maximum risk of deposits at the cathode 1 a metal is selected for the cathode 1 whose redox potential constituting the reference potential is greater than the effective reduction potential of the water and preferably less than the standard reduction potential of the water.

Experience has shown that in the case of water having a determined pH the potential $P_c$ of the metal of the cathode 1 must satisfy the following equation:

$$-0.826 \text{ volts} - 0.059 \text{ pH} < P_c < 0.000 \text{ volts} - 0.059 \text{ pH}$$

The value ($-0.000$ volts$-0.059$ pH) corresponds to the reduction threshold of the water, while the value ($-0.826$ volts$-0.059$ pH) corresponds to the redox pair:

$$2H_2 \text{ gas}/H_2O = -0.826 \text{ volts at pH}=0,$$

designated as the effective reduction threshold $$2 H_2O + 2e^- \rightleftharpoons H_2 + 2OH^-$$

Iron and some of its alloys correspond to this selection. Experience shows that this divergence must be modified to apply it to the following values:

$$-0.826 \text{ volts} - 0.059 \text{ pH} < P_c < -0.059 \text{ volts} - 0.059 \text{ pH}$$

Non-oxidizing steel corresponds to this selection of values.

When there is an effective reduction of the water, the production of $OH^-$ ions is effected according to the following reaction:

$$2 H_2O + 2e^- \rightleftharpoons 2OH^- + H^2$$

These $OH^-$ ions are necessary for the nucleation of the calcium carbonate since they allow bicarbonates to be transformed into carbonates which in association with the calcium ions will produce the nuclei, then the crystals of the calcium carbonate.

The reactions are as follows:

$$HCO_3^- + OH^- \rightleftharpoons CO_3^{--} + H_2O$$

$$CO_3^{--} + Ca^{++} \rightleftharpoons Ca\,CO_3$$

As explained above, this production of $OH^-$ ions by effective reduction of water promotes calcium carbonate deposits on the cathode which limits efficiency over the course of time.

One of the characteristics of the process and apparatus according to the invention consists in that the $OH^-$ ions are produced from the oxygen dissolved in the water rather than from the effective reduction of the water, and this oxygen occurs naturally or is produced artificially.

The reaction is given as:

$$\tfrac{1}{2}O_2 + H_2O + 2e^- \rightleftharpoons 2OH^-$$

The $OH^-$ ions formed in this way are those preferred in the solution in proximity to the cathode (cathodic zone), which promotes a nucleation of the calcium carbonate in solution rather than in deposition on the cathode. Moreover, this reaction does not produce evolution of hydrogen so that the risk of corrosion is lowered.

The aqueous solution only very rarely contains the quantity of dissolved oxygen necessary for a sufficient quantity of calcium carbonate. In this case, according to the invention, a sufficient quantity of dissolved oxygen is introduced into the water by auxiliary means. This can be realized particularly by preliminary aeration of the water, i.e. before it arrives in the tank 1, by introducing oxygen into the water found in the tank i or, in a more advantageous solution, by oxidizing the water at the anode with oxygen evolution.

In every case, the introduction of oxygen must not exceed the possibility of transformation into $OH^-$ ions in the cathodic zone.

In order to introduce the necessary quantity of dissolved oxygen in the preferred solution the anode 3 is brought to a positive potential relative to the reference potential, i.e. that of the cathode 1, by means of a positive regulation incorporated in the electric control device B. For reasons which will be explained in detail in the following, the anode 3 is subjected to a mean dc voltage on which pulses of a specific shape are superposed.

As already noted, the dissolved oxygen in the water to be treated is always reduced at the cathode before the reduction of the water, which explains the lower limit of the possible redox potential (of the cathode 1) ($-0.826$ volts$-0.059$ pH) as indicated in the preceding. For its reduction the dissolved oxygen needs electrons which are provided by the cathode 1. The production of $OH^-$ ions can be calculated according to Faraday's law.

$$OH^- = \frac{I}{96484.6 \times Q},$$

where I is the current intensity and Q is the water throughput.

It must be noted that under certain conditions the range of possible redox potential can be extended to the kinetic reduction blocking zone of the water, but this is only possible at several tenths of a volt. Otherwise, the current which can flow through the electrolytic cell A can be determined as follows: $U = e + RI$, where U is the difference in potential between the anode and the cathode, e is the counter-electromotive force of the cell, R is the resistance of the cell, and I is the current intensity. Tests have shown that it is necessary to maintain the mean potential of the anode 3 (and the potential of this anode in the absence of water throughput) at a value less than the redox potential of oxidation of the water in order to avoid the uncontrolled formation of gaseous oxygen and hydrogen protons. The potential of the anode 3, which is preferably produced from noncorrosive metal such as titanium or graphite, must conform to the following equation:

$$U < (|pc| + (1.229 \text{ volts} - 0.059 \text{ pH}),$$

where U is the difference in mean potential between the anode and the cathode, and $|pc|$ is the absolute value of the redox potential of the metal of the cathode.

In certain cases, the value (1.229 volts—0.059 pH) can be pushed back to the value of the kinetic oxidation blocking of the water. The difference in mean potential between the anode and cathode is thus determined by the following equation:

$$U < (|pc| + (1.63 \text{ volts} - 0.059 \text{ pH})).$$

Of course, this difference in potential must be as great as possible without exceeding these values.

However, tests have shown that a current of sufficient intensity cannot generally be produced by ionic conduction with the differences in potential between the anode and cathode as determined by the equations shown above. To solve this problem, it is provided according to a complementary characteristic of the invention to apply periodic positive pulses of a specific shape to the anode in addition, which pulses are produced by a pulse generator. This allows a number of results to be achieved, namely:

- a mean difference in potential between the anode 3 and the cathode 1 can be maintained within the limits mentioned above. In particular, this mean difference in potential is a function of the amplitude of the pulses;
- the oxidation threshold of the water can be exceeded during the period in which each of these pulses is present and dissolved oxygen can thus be produced and guided toward the cathode by suitably adapting the hydraulic circuit so as to produce $OH^-$ ions without modifying the potential of the cathode;
- an electric current intensity is produced which is sufficient for providing the electrons necessary for transforming the gaseous oxygen into $OH^-$ ions.

An embodiment form of the electric control device B producing the aforementioned pulses 1 is described in the following with reference to FIG. 2 in particular. As has already been indicated, this device includes two output terminals, i.e. a positive output terminal 2+ connected to the anode 3 and a negative output terminal 2− connected to the cathode, i.e. the tank 1. The electric control device B includes a pulse generator 14 whose input is connected to the electric mains supply 15 with the intermediary of a transformer 16 and a water throughput contactor 17. The positive output of the pulse generator 14 is connected to the positive output terminal 2+, i.e. to the anode 3, by the intermediary of a measuring resistor 18 in series, an apparatus 19 for measuring and integrating the electric current intensity being connected to the two terminals of the latter 18. This apparatus 19 is connected to a control input of the pulse generator 14 with the intermediary of a diode 21.

The electric control device 2 likewise includes a circuit 22 for measuring and regulating the mean output voltage U between the two terminals 2+ and 2−, i.e. the mean difference in potential between the anode 3 and the cathode 1. The two outputs of this circuit 22 are connected, respectively, to the positive output of the pulse generator 14 and to the negative output terminal 2−, i.e. to the cathode 1. Its input is connected to the electric mains 15 with the intermediary of a diode rectifier bridge 23, a filter capacitor 24, and a transformer 25. Finally, the circuit 22 is connected to a control potentiometer 27 for the mean difference in potential U.

The circuit which has just been described with reference to FIG. 2 makes it possible to regulate all of the parameters occurring in the process according to the invention, i.e. the mean voltage, the maximum voltage, the pulse frequency, and the intensity, while subjugating them to the desired or reference values, in particular the supplied intensity and the mean difference in potential U between the anode 3 and the cathode 1.

Figure 2:
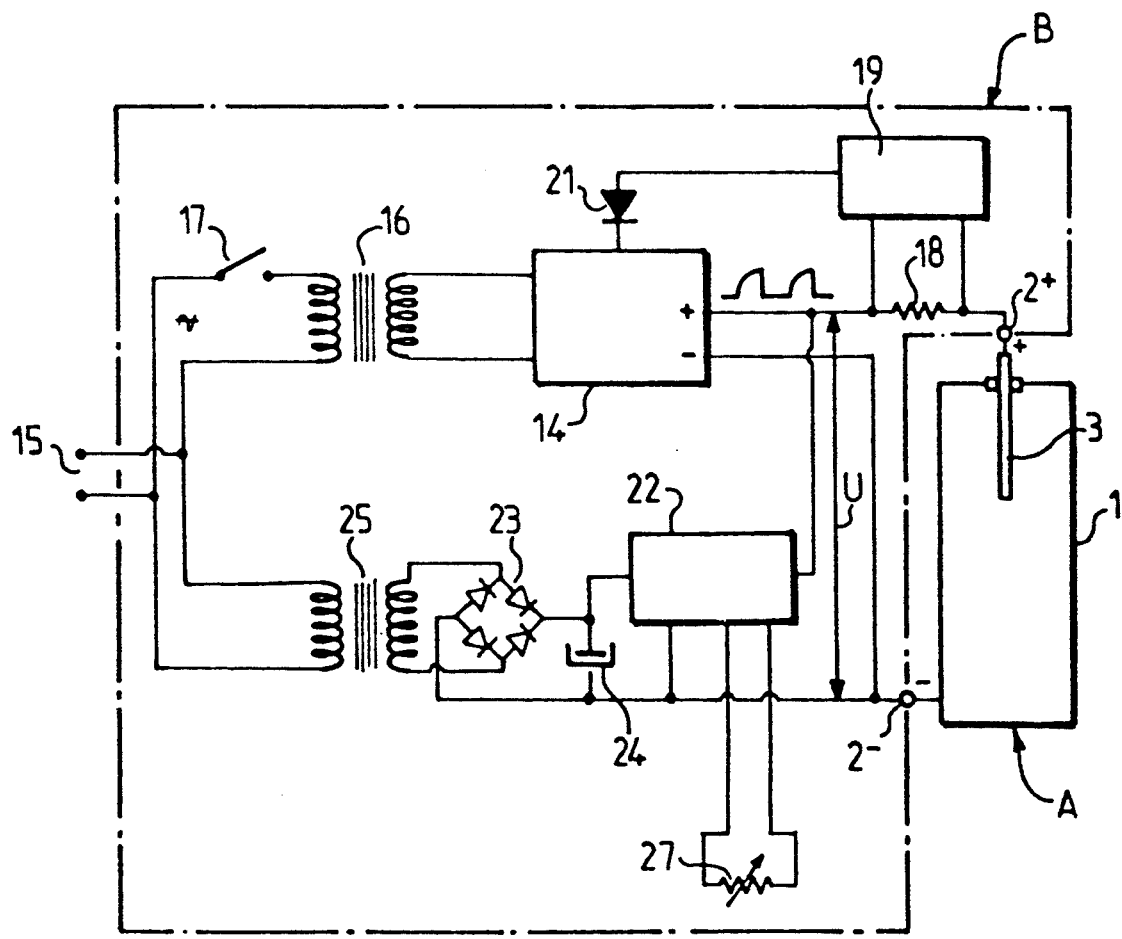

The circuit shown in FIG. 2 makes it possible to ensure a difference in potential U between the cathode 1 and the anode 3 such that the potential of the anode 3 is less than the oxidation potential of the water in the absence of pulses i. This circuit makes it possible, in the absence of a pulse i emitted by the generator 14, to fix the anode 3 at a potential which is greater than that of the cathode 1 by a value U which is that determined by the measuring and regulating circuit 22 fixing a reference value regulated by the potentiometer 27. This reference value of U is selected in such a way that is corresponds to a difference in potential between the anode 3 and the cathode 1 which places the potential of the anode 3 below the oxidation threshold of the water. This difference in potential U which can thus be obtained by interrupting the voltage supplied by the generator 14, e.g. by switching off the power supply to the transformer 16 when the contactor 17 is opened, does not influence the reference potential of the cathode 1.

In the absence of water throughput, the contactor 17 being opened, the pulse generator 14 is not supplied with power, the pulses i are absent, and the anode 3 is kept at the reference voltage U. When there is water throughput, the contactor 17 is closed and the pulse generator 14 is supplied with power. In each interval between the pulses i, the dissolved oxygen in the water is reduced at the cathode 1 into $OH^-$ ions whereas the water is not reduced, while the oxidation of the water is blocked at the anode 3 since the anode 3 is brought to a potential which is less than the oxidation threshold of the water. When a pulse i is present, the dissolved oxygen is always reduced into $OH^-$ ions at the cathode, but the water is not reduced. In contrast, since the potential of the anode 3 is temporarily greater than the oxidation threshold of the water, this water is oxidized at the anode 3 to introduce the additional amount of dissolved oxygen necessary for the production of the $OH^-$ ions at the cathode.

In the absence of the throughput of water, there is a reduction in the dissolved oxygen contained in the water of the electrolytic cell A, but there is neither reduction nor oxidation of the water.

It should be noted that the oxidation of the water in the presence of pulses i produces $H^+$ ions. These $H^+$ ions could react with the $CO_3^{--}$ ions formed at the cathode or with the $HCO_3^-$ ions in accordance with the following reactions:

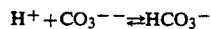

$$H^+ + CO_3^{--} \rightleftharpoons HCO_3^-$$

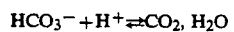

$$HCO_3^- + H^+ \rightleftharpoons CO_2, H_2O$$

Thus it is desirable that these $H+$ ions produced at the anode should not meet the $CO_3^{--}$ carbonate ions produced at the cathode before their evolution into $CaCO_3$. To this end, the electrolytic cell A should be so disposed that the electrodes are separated by a sufficient volume of water and/or that these $H^+$ ions either meet, at first, the unprocessed water high in $HCO_3^-$ ions and low in $CO_3^{--}$ ions or meet the water which has already been treated. This problem was solved at the time of testing by a particular arrangement of the tank 1 and its hydraulic feed as well as by creating a whirlpool or "vortex" effect in the treatment tank as shown in FIG. 3 and explained in the following.

The pulses i emitted by the generator 14 were selected with a specific shape suitable for the treatment in question. It is necessary that there be a very low ratio dV (volt)/dt (time) at the leading edge of every pulse while at the same time limiting undesirable effects on the electrode and with a very short pulse duration to maintain a mean difference in potential U corresponding to the values mentioned above. Thus this type of pulse preferably has a hyperbolic leading edge and a substantially vertical trailing edge as shown in FIG. 2. This pulse shape allows an optimal flow of electric current during the rise of the pulse i and a sharp reaction at the anode 3 when the pulse falls. Other pulse shapes can also be used, but with less favorable results, for example, in the shape of a trapezoid or flat-topped sawtooth, i.e. having a leading edge with a flat slope followed by a horizontal pulse top and a vertical or steep trailing edge.

The relationship between the amplitude, frequency and rest voltage U applied to the anode in the absence of pulses determines the mean voltage of the anode and the amount of current flowing through the treatment cell during the transmission of the pulses. This mean value can thus be adjusted by means of the apparatus 19 for measuring and integrating the current intensity.

According to the invention, the totality of electrical phenomena can be controlled and adjusted automatically based on the reference values, these reference values preferably being the desired intensity during water throughput, the duration of each pulse i which is regulated so as to be as short as possible, and the voltage U.

In the electric circuit as shown in FIG. 2, the frequency of the pulses i determines the current intensity flowing through the cell, and the amplitude of these pulses i determines the mean voltage at the anode 3 in relation to the reference voltage of the cathode 1. For safety's sake, the voltage of the anode 3 is brought to a predetermined reference value when there are no pulses. This value normally corresponds to the reference value U.

As indicated above, the pulse generator 14 only functions if there is water throughput due to the throughput contactor 17. Accordingly, there is no excessive consumption of electric current or risk of corrosion linked to a possible reduction or oxidation of the water (evolution of hydrogen and oxygen).

The mean voltage is maintained by the automatic control associated with the generator. The pulse frequency of the generator 14 is determined by the circuit 19 (electronic integrator) as a function of the desired amperage initially given to the integrator 19 as reference value. The difference in potential between the anode 3 and cathode 1 in the presence of pulses i is a function of the desired amperage and pulse duration. The duration of each pulse can be regulated manually from a microsecond to several milliseconds.

The water treatment process according to the invention can also be implemented in a particularly advantageous manner by means of a circulating-fluid particle separator and particularly in a chamber in which the water to be treated is set in movement in such a way that it forms a whirlpool or "vortex".

Such a device, shown in FIGS. 3 and 4, thus simultaneously contains an electrolytic cell A according to the invention and a whirlpool chamber.

This device includes a cylindrical metallic tank I with a vertical longitudinal axis yy' formed by the cathode of the electrolytic cell A and connected, as already seen, to the negative pole 2— of the electric control device B. The upper part of the cylindrical tank 1 is closed by a cover 30 which is fastened on a circular collar 32 of the tank 1 by bolts 34 with the intermediary of sealing means. The cover 30 is penetrated by a cylindrical tube 36 which is soldered on the latter, extends into the interior of the tank 1 and terminates in a truncated cone 40 which is flared toward the bottom, followed by a cylindrical portion 41 having a smaller diameter than the inner diameter of the tank 1 so that an annular passage 43 is formed between the latter which is suitable for the passage of a whirlpool. The tube 36 is penetrated by an axial anode 3 which is connected to the pole 2+ of the control device (B) and is fixed to the upper part of the tube 36 by a sleeve 42. In addition, the upper part of the tube 36 outside of the tank 1 is connected with a water discharge pipe 44 with the intermediary of an insulating sleeve 46. The upper part of the tank i receives an injection pipe 48 which is fixed on the latter, e.g. by soldering, and whose internal passage opens into the tank 1. The axis xx' of this injection pipe 48 is arranged transversely relative to the longitudinal axis yy' of the tank 1 and tangentially relative to the inner surface of the latter. The outer part of this pipe includes connecting means enabling a connection to a feed source for water to be treated. The lower part of the tank 1 has an annular collar 50. A collecting chamber 54 whose bottom is provided with a drain pipe 56 is fixed on the annular collar 50 by bolts 52. An axial cylindrical support 58 is fixed on the inner face of the collecting chamber 54 and provides for the support of a circular deflector plate 60 at its upper part. The circular deflector plate 60 is perpendicular to the axis yy' of the tank 1 and is provided with a bevel 62 at the circumference of the upper surface. The diameter of the deflector plate 60 is dimensioned in such a way that an annular passage 63 is formed between the lower part of the tank 1 and the deflector plate 60. This annular passage 63 has a determined flow cross section as explained in the following.

The present mode of carrying out the invention makes it possible to create a whirlpool effect or "vortex" in the tank 1. When the water arrives under pressure via the injection pipe 48, the tangential orientation of the latter allows the water admitted into the tank 1 to be subjected to a whirling movement. When the water is injected at sufficient velocity, this whirling movement allows the formation of a whirlpool which is concentrated at its base, undergoes a deflection at the deflector plate 60 and forms an ascending axial column which is directed against the flow and acts between the inner surface of the truncated cone 40 and the electrode 3 and is ejected outside the tank 1 via the discharge pipe 44.

Of course, in order particularly to promote the start of the whirlpool formation and the establishment of the ascending axial column of treated water a plurality of injection pipes 48 could be used so as to combine the tangential forces applied to the treated water.

According to the invention, the tank 1 is produced from metal such as iron, whose redox potential constituting a reference potential is judiciously selected so as to prevent certain reactions when contacted.

The whirlpool effect created in the interior of the tank 1 is particularly advantageous for ensuring a fully efficient operation of the device according to the invention.

According to the invention, as explained above, the dissolved oxygen in the water is reduced in proximity to the cathode, i.e. in the present case in proximity to the internal wall of the tank 1, so as to generate the formation of $OH^-$ ions which will react with the bicarbonates present in the water in the dissolved state to form insoluble nuclei of calcium carbonate. Parallel to this reaction, which can be related to an alkaline decarbonization reaction such as that obtained by the injection of soda, the friction boundary layer increases in its concentration of $Ca^{++}$ ions when contacting the wall of the tank 1 which promotes the formation of calcium carbonate nuclei. Under the influence of the whirlpool generated in the tank 1, these calcium carbonate nuclei, as well as the solid particles in suspension in the water, are drawn toward the bottom of the tank 1 and driven through the annular flow cross section 63 provided between the base of the tank 1 and the circular deflector 60 into the collecting chamber 54 by the dynamic action communicated to the water, so that the water which is thus clarified rises again via the whirlpool generated by the deflector plate 60 and is evacuated via the discharge pipe 44 as mentioned above.

The particles received in the collecting chamber 54 thicken progressively to form sludge and are then evacuated via the tube 56 when a valve or an electric valve, not shown in the drawing, is opened.

The present mode of carrying out the invention thus makes it possible to ensure a quasi-permanent regeneration of the cathode which allows the apparatus according to the invention to function in a continuous manner with optimal efficiency.

On the other hand, it is known that in an electrolytic cell of the type used in the invention it is difficult to use soluble anodes since the oxidation produced at the anode generates metallic colloids which combine with the particles suspended in the water to form complexes which in the course of their formation impede the reaction produced at the anode.

The present mode of carrying out the invention enables the use of soluble anodes since the whirlpool created in the tank 1 enables the elimination of the complexes which are evacuated in the collecting chamber 54.

The use of a soluble anode in an apparatus according to the invention with a whirlpool or "vortex" action is particularly advantageous when said apparatus is used in a closed circuit of the type shown in FIG. 5.

In this particular mode of carrying out the invention, which represents only one example of the multiple applications which can be used in a closed circuit, the apparatus according to the present embodiment form of the invention is used for ensuring the purification of the water in a pool 70. For this purpose, the water is sampled in the pool 70 via a conduit 71 and a pump 72 which injects it into the tank 1 via the water feed pipe 48 at a pressure sufficient for creating a whirlpool or "vortex" effect in the tank 1 as described above. This whirlpool action is concentrated at its base, undergoes a deflection on the reflector plate and forms an ascending axial column of purified water which exits the tank 1 and returns to the pool 70 via a conduit 76. The flow of purified water carries along metallic ions formed at the anode, since the latter is a soluble anode, and these ions are brought along into the conduits 76 and 71 where they react with the mineral salts of the water to form colloids which are deposited on the inner surface of the conduits 76 and 71 so as to protect them against corrosion. The surplus colloids return to the apparatus in a subsequent cycle and these colloids are evacuated by the whirlpool action into the collecting chamber 51 from which they are subsequently discharged in the form of sludge. The apparatus thus allows the conduits to have only the quantity of colloids necessary for protecting them against corrosion since the surplus is discharged by the apparatus, which prevents them from accumulating in the conduits as conventionally occurs in the apparatuses of the prior art.

When the properties of the soluble anode are selected in a suitable manner, a chemical treatment of water circulating in a closed circuit can also be realized. Thus the use of a silver anode ensures an oxidation of the organic matter contained in the circuit 70 so that the device according to the invention has a bactericidal function. Similarly, the use of a copper electrode provides the device according to the invention with algicidal properties.

Although it was indicated in the preceding description that the process and apparatus according to the invention are applied in particular to the decarbonization of water, they may, of course, also be used for other purposes, particularly for the aggressive treatment of water with a high content of dissolved oxygen in order to lower the level of dissolved oxygen and thus reduce corrosion.

I claim:

1. Apparatus for the treatment of water by electrolysis for the purpose of decarbonizing the water, having an electrolytic cell (A) and an electric control device (B), the electrolytic cell (A) comprising:

a tank (1) to which are connected a feed pipe (5, 48) for the water to be treated and an outlet pipe (7, 44) for the treated water; at least one anode (3) being engaged in the tank (1);

said tank (1) comprising said cathode of said electrolytic cell (A) and being taken as a reference electrode;

said tank (1) being constructed of a metal whose redox potential is greater than the effective reduction threshold of the water;

an insulating sleeve (4, 38) for electrically insulating said anode (3) from said tank (1), said anode (3) penetrating into said tank (1) through said insulating sleeve (4, 38);

said feed pipe (5) for the water to be treated and said discharge pipe (7) for the treated water opening into the interior of said tank (1) and means electrically insulating said feed pipe and said discharge pipe from the wall of said tank including insulating sleeves (6,8) and the electrical conductivity between the pipes (5, 7) being ensured by a conductor (9) which does not touch said tank (1).

2. Apparatus according to claim 1, wherein the tank (1) is insulated from ground.

3. Apparatus according to claim 1, wherein the tank (1) includes means suitable for creating a whirlpool or vortex in the interior of the tank (1), the outer and inner peripheries of the whirlpool or vortex coming into contact, respectively, with the walls of the tank (1) constituting the cathode and with the anode (3).

4. Apparatus according to claim 3, wherein the tank (1) is formed by a cylindrical tube with a longitudinal and vertical (yy') axis which is closed at its upper end and is provided with means (48) for injecting the water to be treated, which means (48) are oriented tangentially relative to the inner wall of the tank (1) so as to create said whirlpool in the latter, said tank (1) having at its base an annular duct (63) serving to evacuate particles contained in the liquid to be treated and a collecting chamber (54) suitable for collecting the latter, the lower end of the tank (1) having deflecting means (60) at the center of the annular duct (63), which means (60) enable the formation of an axial column of treated liquid, axial discharge means (36) being provided at the upper portion of the tank (1) for ensuring the discharge of the axial column of treated liquid from the tank (1).

5. Apparatus according to claim 4, wherein the anode (3) is in the form of a cylindrical bar disposed along the axis (yy') of the tank (1), the axial discharge means being formed by a tube (36) which encloses the anode (3) and is connected to the water outlet pipe (44).

6. Apparatus according to claim 1, wherein the water to be treated is arranged in a "closed circuit", by feeding the water to an inlet (5, 48) and withdrawing the water from an outlet (7, 44), both said inlet and said outlet being connected to the same water source (70).

7. Apparatus according to claim 1, wherein said electric control device (b) includes a periodic pulse generator (14), whose output is connected to the anode (3) of the electrolytic cell (A), and means (18, 19) for measuring and integrating the electric current intensity in the electrolytic cell (A), which means (18, 19) are connected to the pulse generator (14) in such a way that the operation of this generator depends on the current intensity measurement.

8. Apparatus according to claim 7, wherein said pulse generator (14) is provided in such a way that it produces pulses (i) whose leading edge has a flat slope and whose trailing edge is vertical or has a steep slope.

9. Apparatus according to claim 1, wherein said electric control device (B) includes a circuit (22) for measuring and regulating the output voltage (U) between the two output terminals (2+, 2−) of the control device, that is, the mean difference in potential between the anode (3) and the cathode (1), and a potentiometer (27) which is connected to the circuit (22) for measuring and regulating this mean difference in potential (U) so as to allow the regulating of this difference.

10. Apparatus according to claim 1, including at least one water throughput contactor (17), which is opened or closed, respectively, in the absence or presence of water throughput, and is connected between electrical mains supply (15) and circuits (14, 22) of the electric control device (B).

11. Apparatus for the treatment of water by electrolysis for the purpose of decarbonizing the water, having an electrolytic cell (A) and an electric control device (B), the electrolytic cell (A) comprising:
   a tank (1) to which are connected a feed pipe (5, 48) for the water to be treated and an outlet pipe (7, 44) for the treated water;
   at least one anode (3) engaged in said tank (1);
   said cathode of the electrolytic cell (A) being constituted by said tank (1) and being taken as a reference electrode; said tank (1) being constructed of a metal whose redox potential is greater than the effective reduction threshold of the water;
   said tank (1) including means suitable for creating a whirlpool or vortex in the interior of said tank (1), outer and inner peripheries of the whirlpool or vortex coming into contact, respectively, with the walls of said tank (1) constituting the cathode and with the anode (3);
   said tank (1) being formed by a cylindrical tube with a longitudinal and vertical (yy') axis which is closed at its upper end and is provided with means (48) for injecting the water to be treated;
   said means (48) being tangentially relative to the inner wall of said tank (1) for creating said whirlpool in the latter;
   said tank (1) having at its base an annular duct (63) for evacuating particles contained in the liquid to be treated and a collecting chamber (54) suitable for collecting the latter;
   the lower end of said tank (1) having deflecting means (60) at the center of said annular duct (63), said means (60) enabling the formation of an axial column of treated liquid; and
   axial discharge means (36) for ensuring discharge of the axial column of treated liquid from the tank (1).

12. Apparatus according to claim 11, wherein said anode (3) is in the form of a cylindrical bar disposed along the axis (yy') of said tank (1), said axial discharge means being formed by a tube (36) which encloses said anode (3) and is connected to said water outlet pipe (44).

13. A process for water treatment by electrolysis, particularly for decarbonizing water in a tank forming a cathode, using the cathode as a reference potential which remains substantially constant, in which an electric current is passed through water by ionic conduction between an anode (3) and the cathode (1) connected, respectively, to positive (2+) and negative (2−) poles of an electric control device (B) comprising the steps of:
   selecting a metal for the cathode (1) whose redox potential constitutes a reference potential which remains substantially constant to the water during the electrolysis, and is greater than the effective reduction threshold of the water for preventing the reduction of this water and during electrolysis the OH− ions required for nucleation of calcium carbonate are produced exclusively from the dissolved oxygen in the water.

14. The process according to claim 13, including the step of insulating the cathode (1) against any connection with ground.

15. The process according to claim 13, including the step of dissolving oxygen by means of preliminary aeration of the water.

16. The process according to claim 13, including the step of introducing oxygen into the water during its electrolysis.

17. The process according to claim 13, including the step of maintaining the anode at a potential (U) no greater than the kinetic oxidation blocking value of the water, preferably less than the oxidation threshold of the water.

18. The process according to claim 13, including the step of maintaining the anode during electrolysis at a potential (U) less than the oxidation threshold of the water.

19. The process according to claim 18, including the step of periodically bringing the potential of the anode to a value greater than the oxidation threshold of the water for a very short period of time by applying a periodic electric pulse train (i) to the anode (3).

20. The process according to claim 19, including the step of obtaining said greater value by superposing said electric pulse train on said potential (U) applied to the anode.

21. The process according to claim 20, including the step of applying a periodic pulses (i) having a leading edge with a flat slope and a vertical or very steep trailing edge to the anode.

22. The process according to claim 20, including the step of applying periodic pulses (i) having a shape of a hyperbola and a vertical or very steep trailing edge to the anode.

23. The process according to claim 13, including the step of subjecting the water to a whirling movement in the course of the treatment for moving the elements formed in proximity to at least one electrode so that they are far from the latter; said whirling movement forming a whirlpool or vortex.

24. The process according to claim 23, wherein the outer portion of the whirlpool or vortex comes into contact with the cathode (1) in the course of its movement.

* * * * *